United States Patent [19]

Tadema

[11] Patent Number: 5,297,743
[45] Date of Patent: Mar. 29, 1994

[54] DEVICE FOR PROCESSING CHOCOLATE MASS

[75] Inventor: Jan C. Tadema, Bergen, Netherlands

[73] Assignee: Wiener & Co. Apparatenbouw B.V., Amsterdam, Netherlands

[21] Appl. No.: 907,719

[22] Filed: Jul. 2, 1992

Related U.S. Application Data

[62] Division of Ser. No. 635,860, Dec. 19, 1990, Pat. No. 5,156,878.

[30] Foreign Application Priority Data

Jan. 16, 1990 [NL] Netherlands ................ 9000105

[51] Int. Cl.$^5$ ............................................. B02C 19/12
[52] U.S. Cl. ........................................ 241/80; 241/104; 241/152.2
[58] Field of Search ................ 241/152.2, 80, 104, 241/105

[56] References Cited

U.S. PATENT DOCUMENTS

| | | | |
|---|---|---|---|
| 3,529,778 | 9/1970 | Willmann | 241/152.2 |
| 3,634,106 | 1/1972 | Organ et al. | 99/236 CC |
| 3,663,231 | 5/1972 | Tourell | 99/485 |
| 4,224,354 | 9/1980 | Szegvari | 426/584 |
| 4,976,469 | 12/1990 | Paliard et al. | 241/24 |
| 5,156,878 | 10/1992 | Tadema | 426/631 |

FOREIGN PATENT DOCUMENTS

| | | | |
|---|---|---|---|
| 0157454 | 3/1985 | European Pat. Off. | A23G 1/10 |
| 2013621 | 3/1970 | France | A23G 1/00 |
| 0163708 | 1/1969 | Netherlands | A23G 1/04 |
| 7712453 | 11/1977 | Netherlands | A23G 1/00 |
| 7811567 | 11/1978 | Netherlands | A23G 1/10 |
| 8300228 | 1/1983 | Netherlands | A23G 1/18 |
| 1251043 | 10/1971 | United Kingdom | B02C 17/16 |
| 1568270 | 5/1980 | United Kingdom | A23G 1/06 |

OTHER PUBLICATIONS

Minifie, Bernard W., Chocolate, Cocoa And Confectionery: Science And Technology, 2nd Edition, AVI Publishing Company, Inc., 1980, p. 699.

*Primary Examiner*—Mark Rosenbaum
*Assistant Examiner*—John M. Husar
*Attorney, Agent, or Firm*—Webb, Burden, Ziesenheim & Webb

[57] ABSTRACT

Chocolate is ground in order to obtain a very small average particle size. A determined viscosity is necessary for further processing. In order to keep as small as possible the fraction with particle size lying above the desired value and having an adverse effect on the taste of the final product, according to the invention the process mass is circulated in a cycle incorporating a grinding device and a ball mill. This has the result of accelerating the grinding process and reducing the inconsistency in the distribution of the particle size.

6 Claims, 1 Drawing Sheet

DEVICE FOR PROCESSING CHOCOLATE MASS

This application is a division of application No. 07/635,860, filed Dec. 28, 1990 now U.S. Pat. No. 5,156,878.

BACKGROUND OF THE INVENTION

1. Field of the Invention

The invention relates to a method and device for mixing and grinding chocolate, fats or the like, wherein a process mass of cacao and/or cacao powder, cacao butter, edible fat, sugar and the like are pre-mixed and ground in a grinding device and a ball mill.

2. Description of the Related Art

Up until the present the components for processing were pre-mixed in a pre-mixer and ground in a grinding device. The pre-mixer and grinding device can also be unified to one unit. After grinding the mass is then ground in a ball mill to make it still finer as required until the final desired particle size is obtained.

In a ball mill it is possible to grind the process mass to a very small average particle size and to therein obtain the desired viscosity, although the uniformity in the distribution of the particle size leaves something to be desired. Unless grinding continues to a very small particle size, which is very time-consuming and moreover produces an adverse viscosity value, it can occur that the process mass still has a fraction with particle sizes lying far above the desired value. Such a fraction has an adverse effect on the taste of the final product.

SUMMARY OF THE INVENTION

It is the object of the invention to accelerate the grinding process and obtain a better end product.

This is achieved according to the present invention by choosing a grinding device which reduces the process mass to a certain particle size with a largely uniform distribution of the particle size in the process mass, and having the process mass circulated in a cycle consisting at least of the grinding device and the ball mill, and the process mass is ground to the desired particle size.

Through use of the device and method according to the present invention the particles are reduced to a certain size in the selected grinding device, wherein a large degree of uniformity is achieved. With such a grinding device a limited particle size is reached relatively rapidly, although these particles are still too large for processing as chocolate. A ball mill has the greatest efficiency in grinding at smaller particle sizes. Owing to the circulation process the selected grinding device and the ball mill are therefore optimally used, whereby in a short time a process mass is obtained whereof the particle size meets the requirements set for processing as chocolate, and wherein the particle size distribution has only a small inconsistency.

The viscosity and flow point of the end product are considerably better using the method and device of the present invention than in the prior method of grinding the process mass to the desired particle size in only the ball mill, since, as stated in the foregoing, the presence of large particles can then only be prevented when grinding continues to a very small particle size.

It is also possible to pre-mix and grind in the grinding device until an average desired particle size is obtained and only thereafter to continue the grinding process in the above described cycle. The grinding process in the cycle can for instance be started when the average particle size of the process mass has reached approximately 80 microns. Also in this case are the above stated advantages achieved.

A conventional taste-changer is preferably also incorporated in the cycle. The mass is circulated using a pump.

It is also possible to pre-mix the process mass in the grinding device, which takes place while the mass is already being ground.

The method according to the invention can be performed using a device formed by a cycle consisting of a grinding device, a ball mill connected to the grinding device, a taste-changer connected to the grinding device and the ball mill and a pump for circulating the chocolate mass. The invention is elucidated with reference to the drawing.

BRIEF DESCRIPTION OF THE PREFERRED EMBODIMENT

Figure 1:
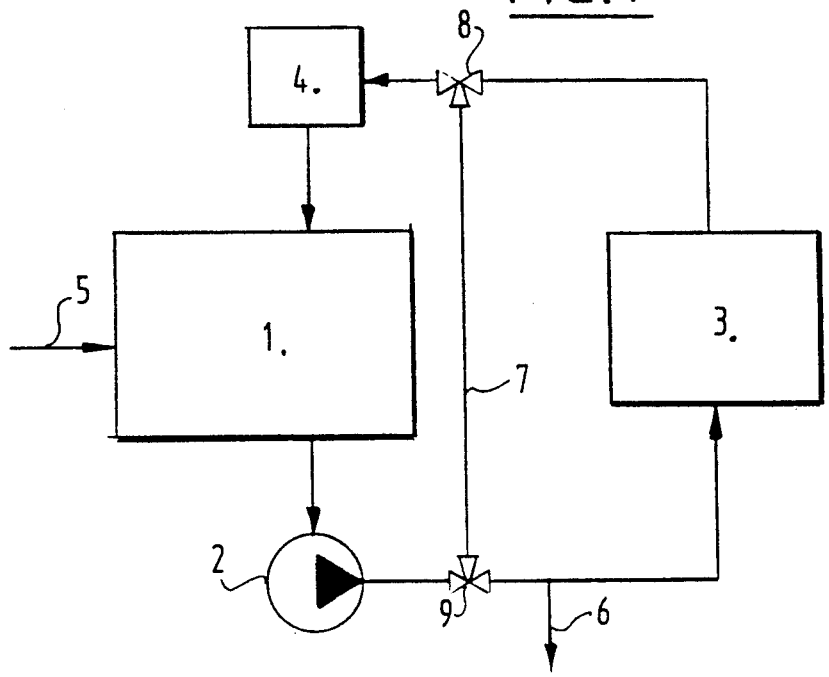
FIG. 1 shows an arrangement of the grinding device and the ball mill of the present invention.

Designated in the drawings with the reference numeral 1 is a grinding device in which the components of the process mass for processing are pre-mixed and ground. Using a pump 2 attached to the grinding device 1 the process mass can be circulated in the cycle. Pump 2 circulates the process mass to a ball mill 3 which is connected with its outlet via a taste-changer 4 to the intake of the grinding device 1. The components for mixing and grinding are introduced into the unit 1 through the in-feed 5 and the finished process mass is discharged via the line 6 from the cycle when the desired particle size is reached. After mixing in the unit 1 the mass can be carried immediately into the cycle by opening valves (not drawn) and while circulating be then ground successively in the grinding device 1 and the ball mill 3. It is also possible to introduce the mass into the cycle only after mixing when a desired average particle size has been reached in the grinding device 1.

The by-pass line 7 can be opened as desired using the three-way valves 8, 9. In this way that run in the cycle can be selected that is the most suitable for processing the process mass.

Figure 2:
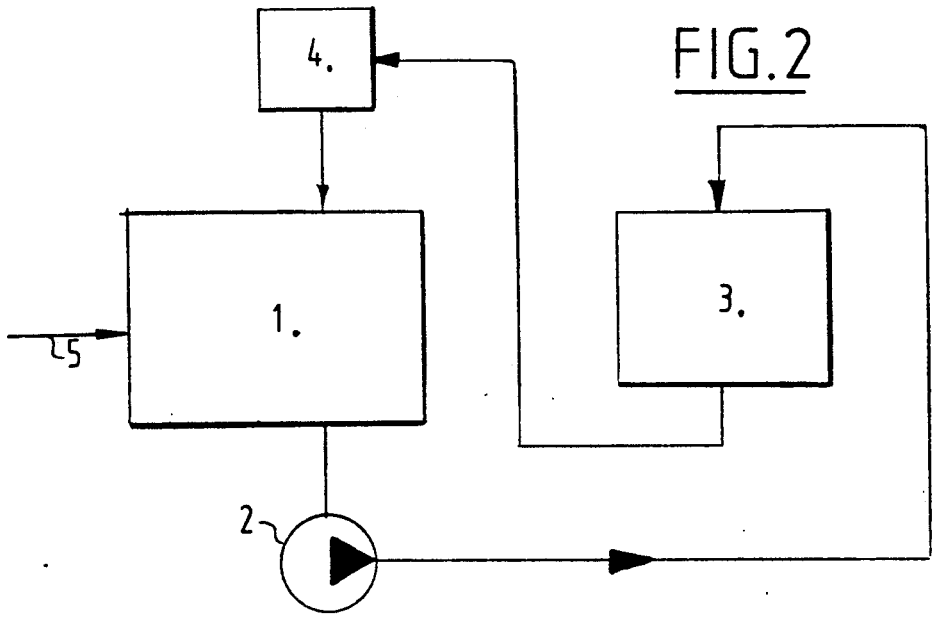
FIG. 2 shows an alternative arrangement of the present invention.

The arrangement of FIG. 2 varies from the arrangement of FIG. 1 in the sense that the process mass is carried in the other direction through the ball mill 3.

I claim:

1. A device for mixing and grinding chocolate, fats or the like, in a cycle comprising:
    a grinding device,
    a ball mill connected to said grinding device,
    a taste-changer connected to said grinding device and said ball mill, and
    a group for circulating the chocolate mass through said cycle attached to said grinding device, wherein said cycle includes said grinding device, said ball mill, and said taste-changer.

2. The device as claimed in claim 1, wherein said grinding device can be connected to either side of said ball mill.

3. The device as claimed in claim 1, further comprises means for shortening said cycle.

4. A device for mixing and grinding chocolate, fats or the like which is pre-mixed into a process mass comprising:
- a grinding device means for grinding said process mass to a certain particle size,
- a ball mill means coupled by a plurality of passage means to said grinding device means to further grind said process means,
- said plurality of passage means including a first passage extending from an outlet of said grinding device means to an inlet of said ball mill means and a second passage means extending from an outlet of said ball mill means to an inlet of said grinding device means,
- a circulating means coupled to said passage means between said ball mill means and said grinding device means for circulating said process mass between said grinding device means and said ball mill means through said passage means, and
- a taste-changer means coupled to said second passage means between said outlet of said ball mill means and said grinding device means for changing the taste of said process mass.

5. The device of claim 4 further including a discharge passage means coupled to said first passage means.

6. The device of claim 5 further including a bypass passage means extending between said first passage means and said second passage means.

* * * * *